Figure 1:
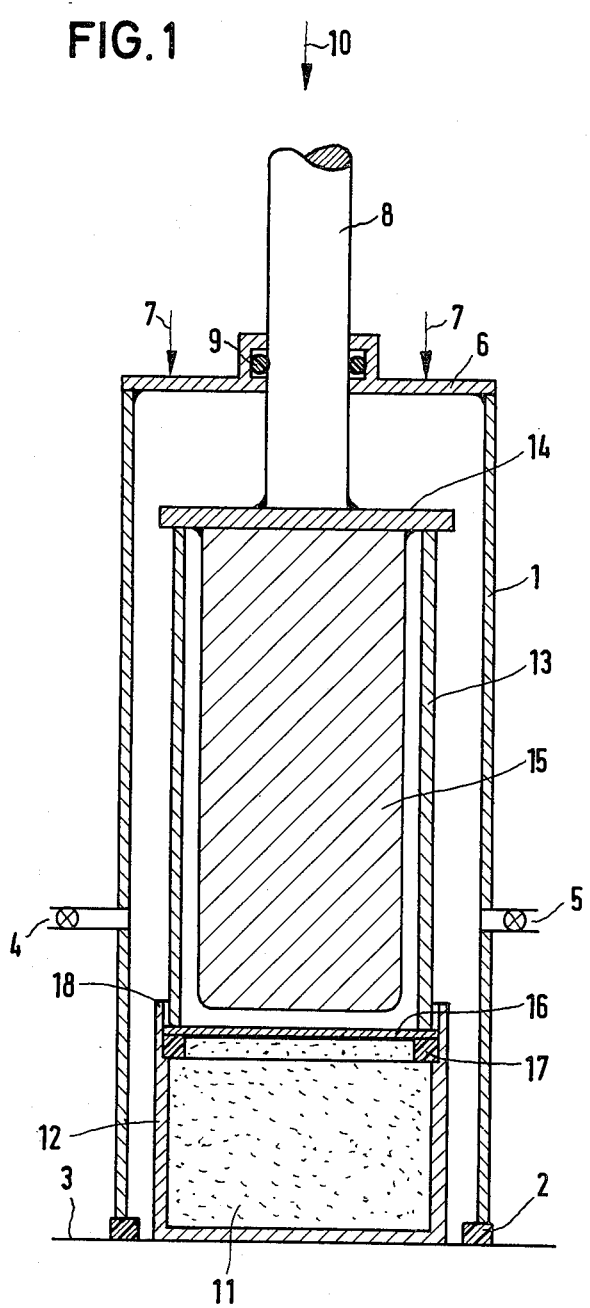

United States Patent [19]
Overkott

[11] B 3,924,382

[45] Dec. 9, 1975

[54] METHOD FOR MAKING CARTRIDGES CONTAINING PRESSURE GAS AND MEANS FOR CARRYING OUT THIS METHOD

[75] Inventor: Franz Josef Overkott, Gevelsberg, Germany

[73] Assignee: Dr. Carl Ullrich Peddinghaus, Wuppertal, Germany

[22] Filed: Jan. 11, 1973

[21] Appl. No.: 322,777

[44] Published under the Trial Voluntary Protest Program on January 28, 1975 as document no. B 322,777.

[30] Foreign Application Priority Data
Jan. 11, 1972  Germany.............................. 2201177
Dec. 14, 1972  Germany.............................. 2261277

[52] U.S. Cl............................................ 53/7; 53/86
[51] Int. Cl.² ........................................ B65B 31/02

[58] Field of Search .................. 53/7, 86, 81, 82, 83

[56] References Cited
UNITED STATES PATENTS
1,790,787   2/1931   Badger.................................... 53/83
2,685,383   8/1954   Kochner ............................. 53/83 X
3,440,797   4/1969   Spielmann ............................ 53/7 X

*Primary Examiner*—Travis S. McGehee
*Attorney, Agent, or Firm*—Holman & Stern

[57] ABSTRACT

A method of making pressurised gas cartridges, particularly for oscillation dampers, where the cartridge has a loosely fitting sealing cap, and after filling with gas, the cap is pressed against a seal with a pressure exceeding the gas pressure inside the cartridge, the assembly then being subjected to ambient pressure and the sealing cap is firmly secured to the cartridge outer wall.

5 Claims, 2 Drawing Figures

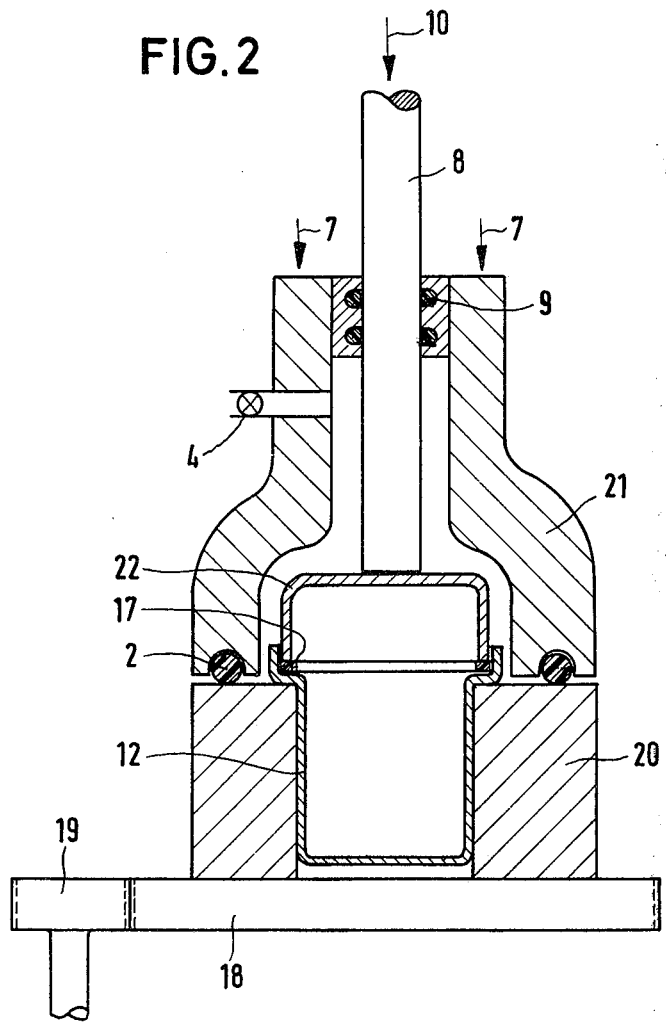

000
METHOD FOR MAKING CARTRIDGES CONTAINING PRESSURE GAS AND MEANS FOR CARRYING OUT THIS METHOD

The invention relates to a method of making cartridges containing pressurised gas, which are intended for use particularly in hydr-pneumatic oscillation dampers which have a cylinder and a damping piston guided in said cylinder. The invention also relates to means for carrying out this method.

Cartridges of this kind have first to be filled with a pressurised gas and then sealed. If they are to be used for hydro-pneumatic oscillation dampers or similar devices, they must also be easy to open during operating.

Examples of this are described in the U.S.A. Pat. Application No. 204,034, filed on Dec. 2nd, 1971.

The object underlying the invention is to obtain a reliable and economical method of filling cartridges with a pressurised gas at a precisely predetermined pressure and means suitable for carrying out this method.

According to the invention, this is achieved in a first embodiment in that the cartridge, with a detachable sealing cap, is subjected to a pressurised gas atmosphere until it has filled with the pressurised gas in in that the sealing cap is then pressed against a seal of the cartridge with a pressure exceeding the inside pressure of the cartridge, this arrangement is then subjected to the normal ambient atmosphere, and the sealing cap, in its pressed on state, is firmly secured to the outer wall of the cartridge.

In another embodiment, in which a tube, which is open at the front end, is connected to a cartridge seal and can constitute the cylinder of a hydro-pneumatic oscillation damper, the object of the invention is solved in that the cartridge is fitted with a detachable sealing disc and the tube connected to said disc is subjected to a pressurised gas atmosphere until the cartridge has filled with the pressurised gas, and the tube is then pressed against the sealing disc with a pressure exceeding the pressure inside the cartridge and in that this assembly is then subjected to the normal ambient temperature and the tube is firmly secured to the outside wall of the cartridge.

In both cases therefore, the cartridge is filled with pressurised gas, under the influence of the pressurised gas atmosphere, because the sealing cap or the tube with the sealing disc are first only fitted in a detachable manner. This filling process only takes a very short time. After this, either the sealing cap is pressed on directly or the sealing disc is pressed on, with the help of the tube, and the outside pressure is lowered to the ambient pressure so that the final join can be made. If a sealing cap is used, there is the advantage that force can be applied relatively easily to the cap because the force can be directed centrally onto the cap which is usually domed. Moreover, the pressure cap proposed for carrying out the method can be constructed relatively small so that the gas leakages, which cannot be avoided when the pressure cap is lifted off after each filling process, can be small because the pressure cap is filled almost completely by the sealing cap and a piston which presses on the sealing cap. If a sealing disc is used which cannot have force applied on it centrally because of the danger of bending, the force is applied in a peripheral manner through the tube which can form the later cylinder of the oscillation damper. It is true that for this the pressure cap or the surrounding cylinder must be constructed relatively large, however, the increased resultant gas losses which are unavoidable, can be reduced with the help of compressor bodies, as will be described later.

The joining of the tube with the cartridge or of the sealing cap with the outer wall of the cartridge is advantageously effected by means of a high speed process such as for instance, soldering, friction welding, electron-beam welding and similar processes. Electric arc-welding under protective gas conditions has proved to be particularly effective. Welding has a particular significance here because it provides a double sealing effect. The sealing disc or the sealing cap already abut, on their side facing the cartridge, on a ring seal provided in the cartridge so that it would be sufficient if just one sufficiently firm join were made between the sealing cap and the tube on the one hand and the cartridge on the other hand. However the welded join is not only a firm join but is at the same time a tight join so that the cartridge is in fact doubly sealed.

For the method used in conjunction with a sealing cap, the means proposed for carrying out the method are characterised in that the cartridge, which is constructed of bowl shape with a section having an outside diameter which is at the most equal to the inside diameter of the cylinder and which has a section adjoining this of larger diameter and open at the end side, can be inserted, with its section of smaller diameter, in a block onto which a pressure cap which has at least one delivery connection for the pressure gas can be placed in a sealing manner together with the pressure piston which passes through said cap in a sealing manner, whereby the pressure cap is constructed with an inside measurement corresponding to the sealing cap and to the sealing piston.

For the case where a sealing disc with a tube attached can be used, the means for carrying out the method are characterised in that an outer cylinder which has a pressure piston passing through it in a sealing manner, at the front end, can surround the cartridge with the tube. The outer cylinder also has a delivery connection for the pressurised gas, the tube is forced against the sealing disc of the cartridge by means of the piston.

The block provided for receiving the section of the cartridge with the smaller diameter is conveniently made of a metal with good heat conducting properties. This has the advantage that the cartridge, when the pressure cap is withdrawn after it has been filled with pressurised gas, whereby the sealing cap remains pressed on with the help of the piston, can remain in the block until the sealing cap has been joined to the edge of the cartridge, for instance by welding. The metal which forms the block, on the one hand, conducts away the heat which is given off while on the other hand, it serves to provide a contact.

In order to illustrate the invention further reference is made to the drawings. In these, FIG. 1 shows a first embodiment in which a cartridge with sealing disc and connected tube is used, while FIG. 2 shows a second embodiment of the invention in a cartridge with a sealing cap.

From FIG. 1, can be seen first the outer cylinder 1 which is pressed onto the base plate 3 by means of the sealing ring 2. A delivery connection 4 and a pressure compensating connection 5 are provided in the wall of the outer cylinder 1. During filling the pressure compensating connection 5 is closed and the delivery connection 4 is open so that a pressure of for instance 40 to 80 ata can build up inside the outer cylinder 1.

The outer cylinder 1 is sealed at its top end by means of an annular disc 6 onto which the pressure is applied in the direction of the arrows 7. The annular disc 6 is pierced centrally by a piston 8 whereby a seal 9, which is designed in a suitable manner, is provided between the piston and the annular disc. Independently of the pressure acting in the direction of the arrows 7, a pressure acting in the direction of the arrow 10 acts on the piston 8 so that through this the cartridge 12 which is filled with pressurised gas 11 can be kept closed.

The pressure plate 14 which is connected to the pressure piston 8 acts on the tube 13 which is constructed as the cylinder of a hydro-pneumatic oscillation damper. The compressor body 15 which fills the inside of the tube 13 to a large extent is also illustrated. The whole arrangement can of course be lower and only a short tube attachment need be connected to the cartridge 12, said tube later being joined by welding to the cylinder tube 13.

The lower edge of the tube 13 is placed first loosely and then under tension on the sealing disc which is in turn fitted on an inner shoulder of the wall of the cartridge by means of a sealing ring 17. The outer wall of the cartridge 12 continues for a short way beyond the tube 13 and forms a connecting edge 18 which is joined by welding to the outer wall of the tube 13 when the pressure piston 8 is loaded.

In FIG. 2, a block 20 is shown which is placed on a rotating plate 18 which can be driven with the help of the pinion 19. The lower portion of the cartridge 12 is inserted in this block. The front face of the block 20 is constructed with a seal 2 which guarantees a tight connection with the pressure cap 21. Said pressure cap has a delivery connection 4 for the pressure gas to be used for filling. In addition, the pressure cap 21 has extending through a seal therein the piston 8, the upper seal 9 serving this purpose. The pressure piston 8 can in addition be acted upon by a force acting in the direction of the arrow 10. Its lower end is preferably designed so that it is magnetic, so that during assembly, it can hold the sealing cap 22 and bring it into the desired position. At the junction point of the two portions of the cartridge 12, a further sealing ring is provided, 17, and the lower edge of the sealing cap 22 rests on this ring 17.

Initially, in the cartridge 12 which is fixed in the block 20, the sealing cap 22 with the pressure piston 10 and the sealing cap 12 which adheres to said piston are placed loosely in position. The pressure cap is then pressed on, for instance through the action of a force in the direction of the arrows 7, and the delivery connection 4 for the pressurised gas is opened. When the cartridge 12 has filled with pressurised gas, the pressure piston 8 is loaded, the delivery connection 4 is closed and the pressure cap 21 is pulled up. Welding can then take place and for this a welding appliance, which is not shown in the drawings, is directed at the upper edge of the portion of the cartridge 12 with the larger diameter. The cartridge 12 is thus welded to the sealing cap 22 while the plate 18 rotates.

I claim:

1. A method of making cartridges containing a pressurised gas, particularly for use in hydro-pneumatic oscillation dampers, comprising fitting the cartridge with a loosely fitted sealing cap lying on a sealing ring surrounding an opening of the cartridge, subjecting the cartridge to a pressurised gas until it has filled with the pressurised gas, pressing the sealing cap against the sealing ring of the cartridge with a pressure exceeding the pressure inside the cartridge, subjecting the cartridge and sealing cap to normal ambient atmospheric pressure and firmly securing the sealing cap to the outer wall of the cartridge.

2. A method as claimed in claim 1 wherein a tube attached to said sealing cap is fitted to the cartridge, the tube being finally firmly secured to the outer wall of the cartridge.

3. A method as claimed in claim 1 wherein a high speed process is used to secure the sealing cap to the outer wall of the cartridge.

4. A method as claimed in claim 2 wherein a high speed process is used to secure the tube to the wall of the cartridge.

5. A method as claimed in claim 3 wherein a welding process is used to secure the sealing cap to the outer wall of the cartridge.

* * * * *